(12) United States Patent
Long et al.

(10) Patent No.: US 9,784,128 B2
(45) Date of Patent: Oct. 10, 2017

(54) SYSTEMS AND METHODS FOR ENGINE BEARINGS

(71) Applicant: United Technologies Corporation, Hartford, CT (US)

(72) Inventors: Wesley P. Long, Vernon, CT (US); Julie J. Marquis, West Hartford, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 55 days.

(21) Appl. No.: 14/575,464

(22) Filed: Dec. 18, 2014

(65) Prior Publication Data

US 2015/0308510 A1 Oct. 29, 2015

Related U.S. Application Data

(60) Provisional application No. 61/983,784, filed on Apr. 24, 2014.

(51) Int. Cl.
| | |
|---|---|
| *F01D 25/16* | (2006.01) |
| *F16C 33/58* | (2006.01) |
| *F16C 27/04* | (2006.01) |
| *F16C 19/06* | (2006.01) |

(52) U.S. Cl.
CPC ........... *F01D 25/16* (2013.01); *F01D 25/164* (2013.01); *F16C 27/045* (2013.01); *F16C 33/581* (2013.01); *F16C 33/586* (2013.01); *F05D 2220/32* (2013.01); *F05D 2240/50* (2013.01); *F16C 19/06* (2013.01); *F16C 2226/50* (2013.01); *F16C 2360/23* (2013.01)

(58) Field of Classification Search
CPC ...... F01D 25/16; F01D 25/162; F01D 25/164; F05D 2240/50; F16C 2360/23; F16C 25/06; F16C 25/08
See application file for complete search history.

(56) References Cited

U.S. PATENT DOCUMENTS

| | | | | |
|---|---|---|---|---|
| 3,005,668 A | * | 10/1961 | Szydlowski | F01D 25/164 384/535 |
| 3,205,024 A | * | 9/1965 | Morley | F01D 25/164 384/582 |
| 4,084,861 A | * | 4/1978 | Greenberg | F01D 25/164 384/105 |
| 4,451,110 A | * | 5/1984 | Forestier | F01D 25/164 384/582 |

(Continued)

FOREIGN PATENT DOCUMENTS

CN 203384283 * 1/2014

*Primary Examiner* — Alan B Waits
(74) *Attorney, Agent, or Firm* — Snell & Wilmer, L.L.P.

(57) ABSTRACT

Systems and methods are disclosed herein for bearings in a gas turbine engine. A bearing system may include a squirrel cage and a bearing support cage coupled to the squirrel cage. The bearing support cage may include an outer race and a fenestrated cone. The bearing support cage may include a support cage anti-rotation tab adjacent to the outer race. The bearing system may include a housing coupled to the squirrel cage. The housing may include a housing anti-rotation tab. The support cage anti-rotation tab and the housing anti-rotation tab may prevent the bearing system from twisting.

12 Claims, 3 Drawing Sheets

(56) References Cited

U.S. PATENT DOCUMENTS

| | | | | |
|---|---|---|---|---|
| 4,693,616 A * | 9/1987 | Rohra | F01D 25/164 | 384/99 |
| 5,161,940 A * | 11/1992 | Newland | F01D 25/164 | 415/142 |
| 5,704,717 A * | 1/1998 | Cochimin | F16C 17/22 | 310/87 |
| 5,862,706 A * | 1/1999 | Chen | F16H 1/48 | 384/536 |
| 6,443,698 B1 * | 9/2002 | Corattiyil | F01D 25/16 | 384/581 |
| 6,540,483 B2 * | 4/2003 | Allmon | F01D 25/16 | 384/581 |
| 6,682,219 B2 * | 1/2004 | Alam | F01D 25/164 | 384/581 |
| 6,695,478 B2 * | 2/2004 | Bos | F01D 25/164 | 384/99 |
| 7,384,199 B2 * | 6/2008 | Allmon | F01D 25/164 | 384/581 |
| 7,648,277 B2 * | 1/2010 | Laurant | F16C 27/04 | 384/99 |
| 7,857,519 B2 * | 12/2010 | Kostka | F01D 25/164 | 384/535 |
| 8,182,156 B2 * | 5/2012 | Kinnaird | F01D 25/164 | 384/535 |
| 8,322,038 B1 * | 12/2012 | Heidari | F02C 7/06 | 29/898 |
| 8,573,922 B2 * | 11/2013 | Milfs | F16C 19/56 | 384/624 |
| 8,727,629 B2 * | 5/2014 | Do | F01D 25/164 | 384/494 |
| 8,727,632 B2 * | 5/2014 | Do | F01D 25/164 | 384/472 |
| 8,747,054 B2 * | 6/2014 | Witlicki | F01D 25/164 | 415/119 |
| 8,777,490 B2 * | 7/2014 | Cazaux | F16C 19/54 | 384/535 |
| 8,845,282 B2 * | 9/2014 | LaPierre | F01D 25/16 | 415/170.1 |
| 9,016,952 B2 * | 4/2015 | Bedenk | F01D 25/162 | 384/559 |
| 9,279,449 B2 * | 3/2016 | Rouesne | F01D 25/164 | |
| 2002/0067870 A1 * | 6/2002 | Ommundson | F01D 25/164 | 384/99 |
| 2006/0045404 A1 * | 3/2006 | Allmon | F01D 25/164 | 384/581 |
| 2010/0027930 A1 * | 2/2010 | Kinnaird | F01D 25/164 | 384/523 |
| 2013/0280063 A1 * | 10/2013 | Ganiger | F16C 19/54 | 415/229 |

* cited by examiner

SYSTEMS AND METHODS FOR ENGINE BEARINGS

CROSS-REFERENCE TO RELATED APPLICATIONS

This application is a nonprovisional of, and claims priority to, and the benefit of U.S. Provisional Application No. 61/983,784, entitled "SYSTEMS AND METHODS FOR ENGINE BEARINGS," filed on Apr. 24, 2014, which is hereby incorporated by reference in its entirety.

STATEMENT REGARDING FEDERALLY SPONSORED RESEARCH OR DEVELOPMENT

This disclosure was made with government support under contract number FA8650-09-D-2923-0021 awarded by the United States Air Force. The Government has certain rights in the disclosure.

FIELD

The present disclosure relates generally gas turbine engines. More particularly, the present disclosure relates bearing systems in gas turbine engines.

BACKGROUND

Gas turbine engines typically comprise bearings which support the shafts, or spools, of the engine. The bearings may be supported by a squirrel cage structure. The squirrel cage may include a flexible member in the form of a cylindrical cage. The flexibility of the squirrel cage may accommodate vibrations, such as when a rotor experiences vibration due to lateral loading.

SUMMARY

A bearing system may comprise a squirrel cage and a bearing support cage. The bearing support cage may be coupled to the squirrel cage. The bearing support cage may comprise an outer race, a plurality of bearing support cage beams, and a support cage anti-rotation tab adjacent to the outer race.

In various embodiments, the support cage anti-rotation tab may be adjacent to an aft surface of the outer race. The squirrel cage may comprise a plurality of squirrel cage beams. The bearing support cage beams may define a plurality of support cage windows. The bearing system may comprise a housing coupled to the squirrel cage. The housing may comprise a housing anti-rotation tab. The housing anti-rotation tab may be located adjacent to an aft surface of the outer race. The housing anti-rotation tab and the support cage anti-rotation tab may be configured to prevent the outer race from rotating.

A bearing system may comprise a bearing support cage, a squirrel cage, and a housing. The bearing support cage may comprise a support cage flange, an outer race, a fenestrated cone adjoining the support cage flange and the outer race, and a support cage anti-rotation tab adjacent to the outer race. The squirrel cage may comprise a squirrel cage support flange, a fenestrated cylinder, and a housing flange. The housing may be coupled to the housing flange. The housing may comprise a housing anti-rotation tab.

In various embodiments, the housing may comprise a seat, and the seat and the outer race may form a damper gap. The support cage anti-rotation tab and the housing anti-rotation tab may be configured to prevent twisting of the fenestrated cone. The fenestrated cone may comprise a plurality of support cage beams. The fenestrated cone may define a plurality of support cage windows. The support cage anti-rotation tab may be adjacent to an aft surface of the outer race. The fenestrated cylinder may define a plurality of squirrel cage beams.

A gas turbine engine may comprise a spool and a bearing system supporting the spool. The bearing system may comprise a bearing support cage, wherein the bearing support cage comprises an outer race, a fenestrated cone adjacent to the outer race, and a support cage anti-rotation tab adjacent to the outer race.

In various embodiments, the support cage anti-rotation tab may be adjacent to an aft surface of the outer race. The gas turbine engine may comprise a squirrel cage coupled to the bearing support cage, wherein the squirrel cage comprises a fenestrated cylinder. The gas turbine engine may comprise a housing coupled to the squirrel cage, wherein the housing comprises a housing anti-rotation tab. The housing anti-rotation tab and the support cage anti-rotation tab may be configured to prevent twisting of the bearing system.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
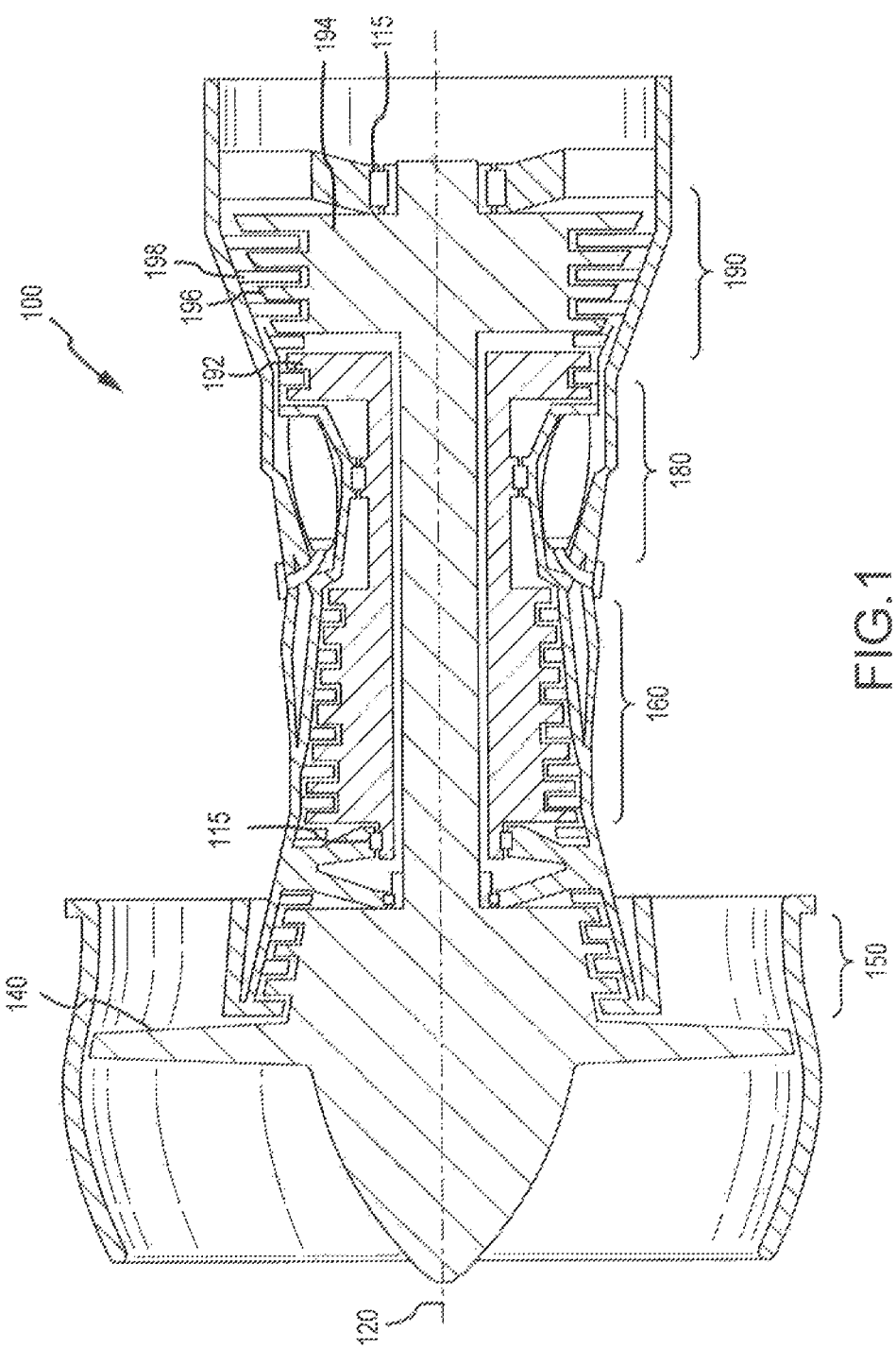
FIG. 1 illustrates a schematic cross-section view of a gas turbine engine in accordance with various embodiments.

Referring to FIG. 1, a gas turbine engine 100 (such as a turbofan gas turbine engine) is illustrated according to various embodiments. Gas turbine engine 100 is disposed about axial centerline axis 120, which may also be referred to as axis of rotation 120. Gas turbine engine 100 may comprise a fan 140, compressor sections 150 and 160, a combustion section 180, and a turbine section 190. Air compressed in the compressor sections 150, 160 may be mixed with fuel and burned in combustion section 180 and expanded across turbine section 190. Turbine section 190 may include high pressure rotors 192 and low pressure rotors 194, which rotate in response to the expansion. Turbine section 190 may comprise alternating rows of rotary airfoils or blades 196 and static airfoils or vanes 198. A plurality of bearings 115 may support spools in the gas turbine engine 100. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2:
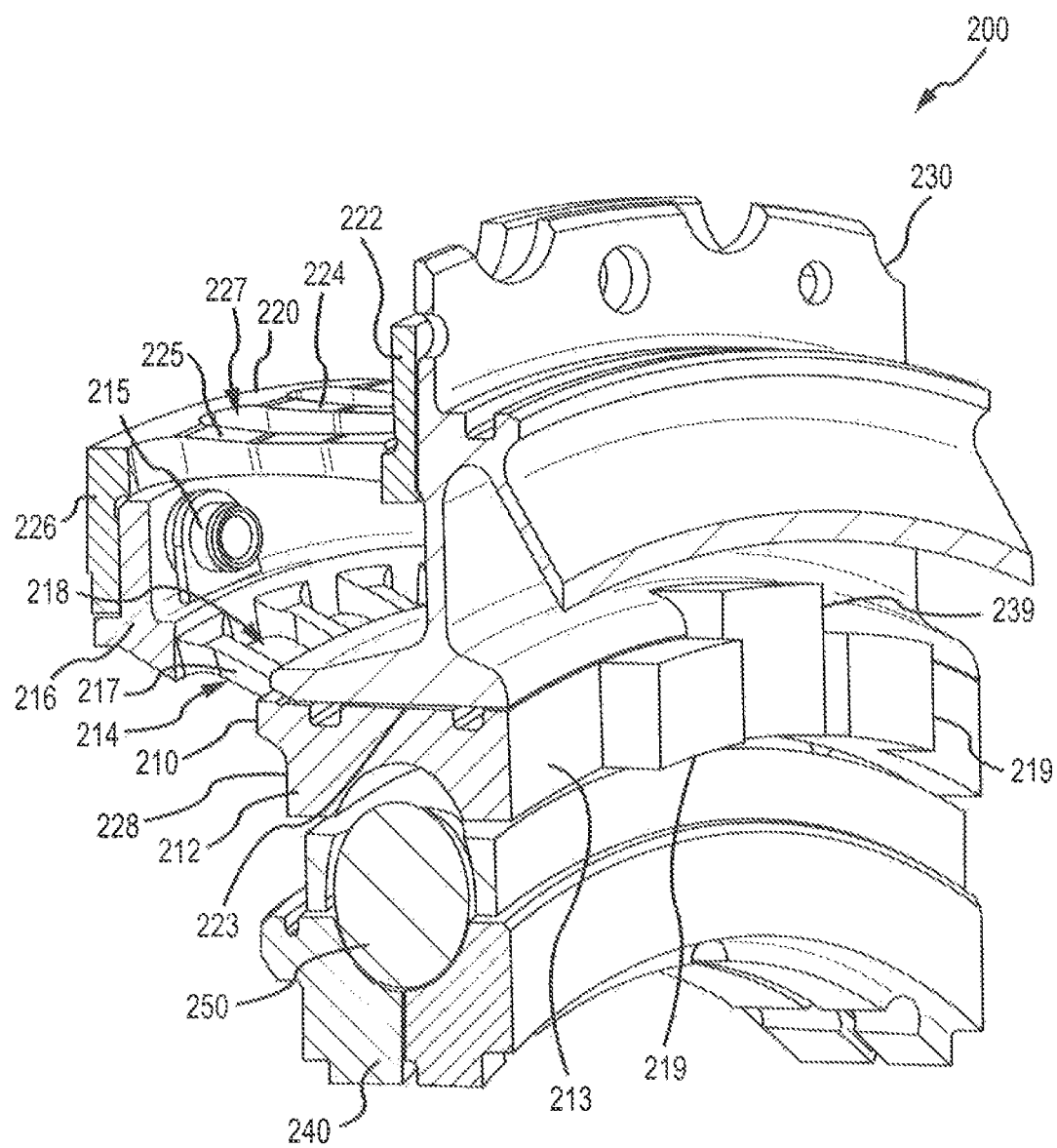
FIG. 2 illustrates a perspective view of a bearing system in accordance with various embodiments.

Referring to FIG. 2, a bearing system 200 is illustrated according to various embodiments. Bearing system 200 may comprise bearing support cage 210, squirrel cage 220, and housing 230. Bearing support cage 210 may comprise outer race 212, fenestrated cone 214, and bearing support cage flange 216. Inner race 240 and outer race 212 may be in contact with bearings 250.

Fenestrated cone 214 may comprise a plurality of bearing support cage beams 217. Fenestrated cone 214 may define support cage windows 218 located between adjacent bearing support cage beams 217. Bearing support cage beams 217 may lend flexibility to fenestrated cone 214 to provide deflection capability to bearing system 200. The dimensions and number of bearing support cage beams 217 may vary as suitable for specific applications.

Squirrel cage 220 may comprise housing flange 222, fenestrated cylinder 224, and squirrel cage support flange 226. Fenestrated cylinder 224 may comprise a plurality of squirrel cage beams 225. Fenestrated cylinder 224 may define squirrel cage windows 227 located between adjacent squirrel cage beams 225. Squirrel cage beams 225 may lend flexibility to squirrel cage 220 to provide deflection capability to bearing system 200. The dimensions and number of squirrel cage beams 225 may vary as suitable for specific applications.

In various embodiments, squirrel cage support flange 226 may be coupled to bearing support cage flange 216 by a plurality of bolts 215. However, in various embodiments, squirrel cage 220 and bearing support cage 210 may comprise a single integral component. Housing flange 222 may be coupled to housing 230. Bearing support cage 210 may be formed from any suitable material, for example a high nickel low carbon bearing steel such as M50NiL or M50. Squirrel cage 220 may be formed from any suitable material, such as titanium.

Fenestrated cone 214 and fenestrated cylinder 224 may allow for deflection of bearing system 200. However, the bearing support cage beams 217 and the squirrel cage beams 225 may be subject to twisting. In the event that bearings 250 bottom out, a torque may be applied to outer race 212, which may cause outer race 212 to rotate relative to bearing support cage flange 216.

In various embodiments, bearing support cage 210 may comprise support cage anti-rotation tabs 219. Support cage anti-rotation tabs 219 may be adjacent to outer race 212. In various embodiments, support cage anti-rotation tabs 219 may extend axially in an aft direction from outer race 212. In various embodiments, housing 230 may comprise a housing anti-rotation tab 239. Housing anti-rotation tab 239 may extend axially in an aft direction from housing 230. In various embodiments, housing anti-rotation tab 239 may be located adjacent to an aft surface 213 of outer race 212. However, in various embodiments, support cage anti-rotation tabs 219 and housing anti-rotation tab 239 may be adjacent to any portion of outer race 212, such as adjacent to an outer surface 223 of outer race 212, or a forward surface 228 of outer race 212.

Support cage anti-rotation tabs 219 and housing anti-rotation tab 239 may be configured to prevent rotation of outer race 212 relative to housing 230. In response to a rotational torque on outer race 212, support cage anti-rotation tabs 219 may contact housing anti-rotation tab 239 and prevent further rotation of outer race 212. Although illustrated as a single housing anti-rotation tab 239 located between two support cage anti-rotation tabs 219 in FIG. 2, in various embodiments, a single support cage anti-rotation tab 219 may be located between two housing anti-rotation tabs 239. In various embodiments, any number of support cage anti-rotation tabs 219 may interact with any number of housing anti-rotation tabs 239 in order to prevent rotation of outer race 212. Furthermore, in various embodiments, support cage anti-rotation tabs 219 and housing anti-rotation tabs 239 may comprise any shape.

Figure 3:
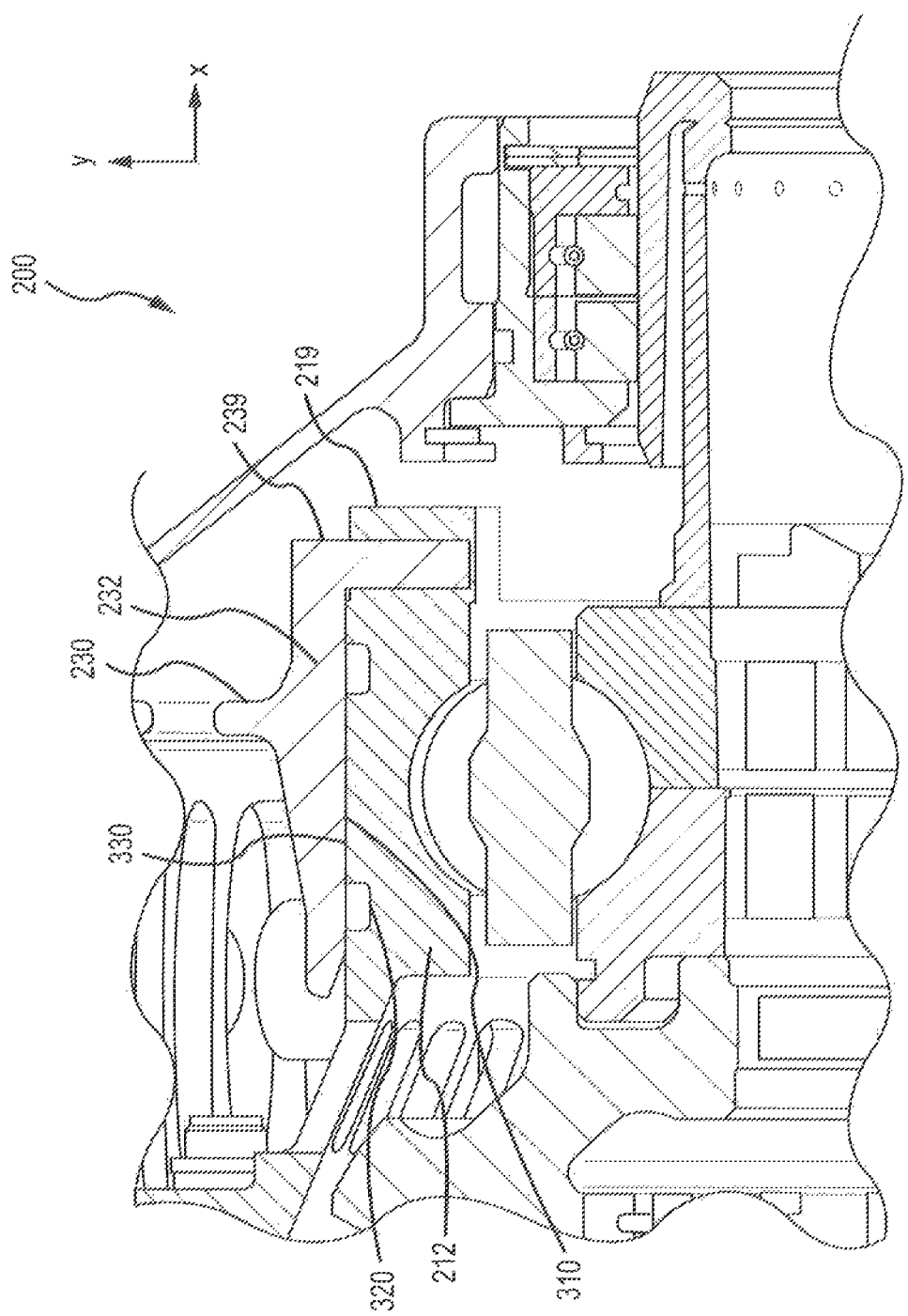
FIG. 3 illustrates a section view of a bearing system in accordance with various embodiments.

Referring to FIG. 3, a section view of bearing system 200 is illustrated according to various embodiments. X-y axes are shown for ease of illustration. Support cage anti-rotation tabs 219 may extend in an aft direction (x-direction) from outer race 212. Housing anti-rotation tabs 239 may extend in an aft direction from housing 230. In various embodiments, housing 230 may comprise a seat 232 which circumscribes outer race 212. Housing anti-rotation tabs 239 may be substantially perpendicular to seat 232. Housing anti-rotation tabs 239 may extend radially inward (negative y-direction) from seat 232.

In various embodiments, a damper surface 310 may be defined in outer race 212 between piston ring grooves 320, which define circumferential channels around outer race 212. A damper gap between the damper surface 310 of outer race 212 and a radially opposed damper surface 330 in the housing 230 may be limited by a stop gap. In various embodiments, oil may be located in the damper gap and provide a damping effect. The stop gap may be the maximum deflection of a spool supported by the bearing system before bottoming out the damper surface 310. The bearing system may bottom out when damper surface 310 in outer race 212 contacts radially opposed damper surface 330 in the housing.

In various embodiments, support cage anti-rotation tabs 219 may be integrally formed with bearing support cage 210. For example, bearing support cage 210 may be a single cast component. However, in various embodiments, the various components may be discrete components. For example, support cage anti-rotation tabs 219 may be welded or bolted to outer race 212. Similarly, in various embodiments, housing 230 may comprise an integral component or comprise a plurality of discrete components.

M50NiL and titanium are described above as exemplary materials. Those skilled in the art will readily appreciate that any other suitable materials can be used without departing from the scope of this disclosure. For example, M50 can be substituted for M50NiL in the example above.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A bearing system in an aircraft engine comprising:
   a squirrel cage comprising a plurality of squirrel cage beams extending between a squirrel cage housing flange located aft of the plurality of squirrel cage beams and a squirrel cage support flange located forward of the plurality of squirrel cage beams, wherein the plurality of squirrel cage beams form a fenestrated cylinder; and
   a bearing support cage comprising an outer race comprising a support cage anti-rotation tab extending in an aft direction from the outer race, a plurality of bearing support cage beams extending in a forward direction from the outer race, and a bearing support cage flange coupled to a forward end of the plurality of bearing support cage beams, wherein the bearing support cage flange is coupled to the squirrel cage support flange, wherein the plurality of bearing support cage beams form a fenestrated cone; and
   a housing coupled to the squirrel cage, the housing comprising a seat circumscribing the outer race, and a housing anti-rotation tab extending in the aft direction from the seat and radially inward from the seat, wherein the housing anti-rotation tab is configured to contact the support cage anti-rotation tab and decrease twisting of the bearing system.

2. The bearing system of claim 1, wherein the support cage anti-rotation tab is adjacent to an aft surface of the outer race.

3. The bearing system of claim 1, wherein the plurality of bearing support cage beams define a plurality of support cage windows.

4. The bearing system of claim 1, wherein the housing anti-rotation tab is located adjacent to an aft surface of the outer race.

5. The bearing system of claim 1, wherein the housing anti-rotation tab and the support cage anti-rotation tab are configured to prevent the outer race from rotating.

6. A bearing system in an aircraft engine comprising:
   a bearing support cage comprising:
      a support cage flange;
      an outer race;
      a fenestrated cone adjoining the support cage flange and the outer race, the fenestrated cone comprising a plurality of bearing support cage beams; and
      a support cage anti-rotation tab adjacent to the outer race and extending in an aft direction from the outer race;
   a squirrel cage comprising:
      a squirrel cage support flange;
      a fenestrated cylinder comprising a plurality of squirrel cage beams; and
      a housing flange; and
   a housing coupled to the housing flange, wherein the housing comprises a seat circumscribing the outer race and a housing anti-rotation tab extending in the aft direction from the seat and radially inward from the seat, wherein the housing anti-rotation tab is configured to contact the support cage anti-rotation tab and decrease twisting of the bearing system.

7. The bearing system of claim 6, wherein the seat and the outer race form a damper gap.

8. The bearing system of claim 6, wherein the fenestrated cone defines a plurality of support cage windows.

9. The bearing system of claim 6, wherein the support cage anti-rotation tab is adjacent to an aft surface of the outer race.

10. A gas turbine engine comprising:
a spool and a bearing system supporting the spool, the bearing system comprising:
- a bearing support cage, wherein the bearing support cage comprises an outer race, a fenestrated cone adjacent to the outer race, and a support cage anti-rotation tab adjacent to the outer race and extending in an aft direction from the outer race, wherein the fenestrated cone comprises a plurality of bearing support cage beams;
- a squirrel cage coupled to the bearing support cage, wherein the squirrel cage comprises a fenestrated cylinder comprising a plurality of squirrel cage beams; and
- a housing comprising a seat circumscribing the outer race, and a housing anti-rotation tab extending in the aft direction from the seat and radially inward from the seat, wherein the housing anti-rotation tab is configured to contact the support cage anti-rotation tab and decrease twisting of the bearing system.

11. The gas turbine engine of claim 10, wherein the support cage anti-rotation tab is adjacent to an aft surface of the outer race.

12. The gas turbine engine of claim 10, wherein the housing is coupled to the squirrel cage.

\* \* \* \* \*